(12) United States Patent
Noh et al.

(10) Patent No.: US 11,418,230 B2
(45) Date of Patent: Aug. 16, 2022

(54) METHOD AND ELECTRONIC DEVICE FOR SENSING GRIP USING DIRECTOR OF ANTENNA MODULE

(71) Applicant: Samsung Electronics Co., Ltd., Gyeonggi-do (KR)

(72) Inventors: Janghwan Noh, Gyeonggi-do (KR); Seunggil Jeon, Gyeonggi-do (KR); Chanyoul Park, Gyeonggi-do (KR); Jaeyoung Huh, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/027,080

(22) Filed: Sep. 21, 2020

(65) Prior Publication Data

US 2021/0091816 A1 Mar. 25, 2021

(30) Foreign Application Priority Data

Sep. 23, 2019 (KR) ........................ 10-2019-0117087

(51) Int. Cl.
*H04B 1/3827* (2015.01)
*H04M 1/02* (2006.01)

(52) U.S. Cl.
CPC .......... *H04B 1/3838* (2013.01); *H04M 1/026* (2013.01); *H04M 2250/22* (2013.01)

(58) Field of Classification Search
CPC .................................................. H04B 1/3838
See application file for complete search history.

(56) References Cited

U.S. PATENT DOCUMENTS

| | | |
|---|---|---|
| 9,768,499 B1 | 9/2017 | Clark et al. |
| 9,883,462 B2 | 1/2018 | Lee et al. |
| 2012/0206556 A1* | 8/2012 | Yu ............................ H04M 1/00 348/14.02 |
| 2014/0361979 A1* | 12/2014 | Woo ...................... H04B 1/0475 343/702 |
| 2015/0303979 A1 | 10/2015 | Shin et al. |
| 2016/0299010 A1 | 10/2016 | Park et al. |
| 2017/0125916 A1 | 5/2017 | Camacho et al. |
| 2018/0288707 A1 | 10/2018 | Jeon et al. |
| 2019/0081404 A1 | 3/2019 | Jeon et al. |
| 2020/0365969 A1 | 11/2020 | Lee et al. |

FOREIGN PATENT DOCUMENTS

| | | |
|---|---|---|
| KR | 1020190060573 | 6/2019 |
| KR | 1020210017235 | 2/2021 |

OTHER PUBLICATIONS

International Search Report dated Dec. 18, 2020 issued in counterpart application No. PCT/KR2020/012474, 3 pages.

* cited by examiner

*Primary Examiner* — Hsinchun Liao

(74) *Attorney, Agent, or Firm* — The Farrell Law Firm, P.C.

(57) ABSTRACT

Disclosed is an electronic device that may sense the proximity of a user by using a director of an antenna module as an electrode of a grip sensor without a separate sensor for detecting the user's proximity, thereby enabling efficient use of the internal space of the electronic device without having to secure a space for mounting a separate sensor. The electronic device may also reduce the power of a transmission signal by a preset back-off value in response to sensing the user's proximity, thereby minimize an adverse effect of electromagnetic waves on the human body caused by signal transmission.

18 Claims, 15 Drawing Sheets

METHOD AND ELECTRONIC DEVICE FOR SENSING GRIP USING DIRECTOR OF ANTENNA MODULE

CROSS-REFERENCE TO RELATED APPLICATION

This application is based on and claims priority under 35 U.S.C. § 119 to Korean Patent Application No. 10-2019-0117087, filed on Sep. 23, 2019, in the Korean Intellectual Property Office, the disclosure of which is incorporated by reference herein in its entirety.

BACKGROUND

1. Field

The disclosure relates generally to an electronic device, and more particularly, to a grip sensing method using the director of an antenna module and an electronic device utilizing the method.

2. Description of Related Art

Portable electronic devices are now able to perform various wireless communication functions such as mobile communication and data communication. For example, portable electronic devices including smartphones, mobile phones and/or tablet computers can provide users with mobile communication, camera, music/video playback, web browsing, and/or wireless communication functions.

With the development of communication technology, a portable electronic device may support an extremely high frequency millimeter wave (mmWave) band and may include at least one antenna module for wireless communication based on the mmWave band. The portable electronic device may perform a wireless communication function corresponding to the mmWave band by using at least one antenna module.

A portable electronic device equipped with a grip sensor may detect a user grip by using the grip sensor and may lower the power of a transmission signal based on the mmWave band in response to detection of a user grip.

When the grip sensor is mounted inside the electronic device, there needs to be an internal space in the electronic device for accommodating the grip sensor. In the conventional art, however, as electronic devices have become slimmer, it is difficult for the electronic device to secure a space for accommodating a grip sensor, which is a deficiency in such electronic devices.

Thus, there is a need in the art for an electronic device that better houses the grip sensor, for more accurate grip detection, less power consumption, and space economization in the electronic device.

SUMMARY

The disclosure is provided to address at least the above-mentioned problems and/or disadvantages and to provide at least the advantages described below.

Accordingly, an aspect of the disclosure is to provide an electronic device that may sense a user grip by using a director (e.g., conductive member) included in at least one antenna module supporting the mmWave band.

Another aspect of the disclosure is to provide an electronic device that may utilize some elements included in at least one antenna module as a grip sensor.

Another aspect of the disclosure is to provide an electronic device that may sense the proximity of the user by using a director of the antenna module as an electrode of a grip sensor without a separate sensor for detecting the user's proximity, thereby enabling efficient use of the internal space of the electronic device without having to secure a space for mounting a separate sensor.

Another aspect of the disclosure is to provide an electronic device that may sense the proximity of the user by using the director included in at least one antenna module and may reduce the power of a transmission signal by a preset back-off value in response to sensing the user's proximity, thereby minimize the adverse effect of electromagnetic waves on the human body caused by signal transmission.

In accordance with an aspect an embodiment. there is provided an electronic device including a housing including a front cover, a rear cover facing in a direction opposite to the front cover, and a side member surrounding a space between the front cover and the rear cover, at least one antenna module arranged in the space and including a printed circuit board (PCB) disposed in the space and including a first surface and a second surface facing in a direction opposite to the first surface, and at least partially including a ground layer, at least one conductive antenna disposed on the first surface of the PCB or disposed close to the first surface in an internal space of the PCB, at least one conductive portion disposed around the conductive antenna, and a wireless communication circuit disposed on the second surface of the PCB and configured to transmit and/or receive a radio signal having a frequency between 3 gigahertz (GHz) and 100 GHz through at least one antenna element, at least one grip sensor circuit disposed in the space and electrically connected to the at least one conductive portion, and at least one processor operatively connected to the at least one antenna module and the at least one grip sensor circuit, wherein the at least one processor is configured to obtain a grip related signal from the at least one conductive portion included in the at least one antenna module, determine whether the electronic device is gripped through the grip sensor circuit based on the obtained signal, and control operations of the at least one antenna module in response to the grip.

In accordance with another aspect of the disclosure, there is provided an electronic device including a housing including a front cover, a rear cover facing in a direction opposite to the front cover, and a side member surrounding a space between the front cover and the rear cover, at least one first antenna module arranged in the space and including a PCB disposed in the space and including a first surface and a second surface facing in a direction opposite to the first surface, and at least partially including a ground layer, at least one conductive antenna disposed on the first surface of the PCB or disposed close to the first surface in an internal space of the PCB, at least one conductive portion disposed around the conductive antenna, and a wireless communication circuit disposed on the second surface of the PCB and configured to transmit and/or receive a radio signal having a frequency between 3 GHz and 100 GHz through at least one antenna element, at least one second antenna module arranged in the space and configured to transmit and/or receive a radio signal having a frequency between 700 hertz (Hz) and 3 GHz through at least one antenna element, at least one grip sensor circuit arranged in the space and electrically connected to the at least one conductive portion included in the at least one first antenna module and at least one conductive portion included in the at least one second antenna module, and at least one processor operatively connected to the at least one first antenna module, the at least one second antenna module, and the at least one grip sensor circuit, wherein the at least one processor is configured to obtain a first signal related to a grip from the at least one conductive portion included in the at least one first antenna module, obtain a second signal related to a grip from the at least one conductive portion included in the at least one second antenna module, identify a grip pattern on the electronic device based on the first signal and the second signal, and control operations of the first antenna module and the second antenna module based on the identified grip pattern.

In accordance with another aspect of the disclosure, there is provided a grip sensing method including obtaining a first signal based on at least one conductive portion included in at least one first antenna module, determining whether an electronic device is gripped by using a grip sensor circuit based on the obtained first signal, and controlling the at least one first antenna module in response to the grip.

BRIEF DESCRIPTION OF THE DRAWINGS

The above and other aspects, features and advantages of certain embodiments of the disclosure will be more apparent from the following detailed description, taken in conjunction with the accompanying drawings, in which the same or similar reference symbols may be used to refer to the same or like parts, and in which.

DETAILED DESCRIPTION

Figure 1:
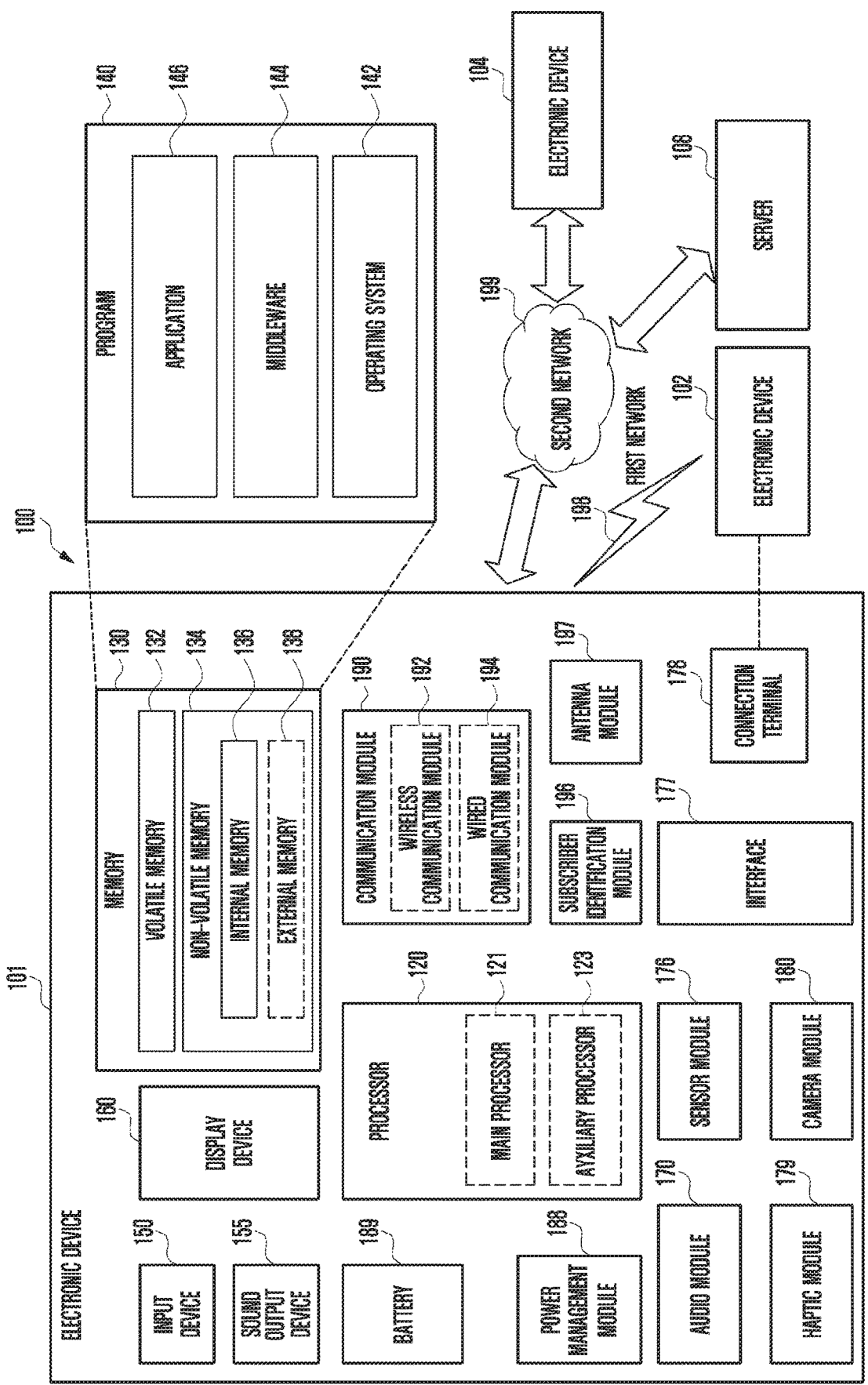
FIG. 1 is a block diagram of an electronic device in a network environment according to an embodiment.

Hereinafter, embodiments will be described in detail with reference to the accompanying drawings. Although specific embodiments are illustrated in the drawings and described in detail with reference thereto, this is not to limit the embodiments to specific forms. Detailed descriptions of known functions and/or configurations will be omitted for the sake of clarity and conciseness.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 (e.g., DRAM, SRAM or SDRAM) may include the volatile memory 132 or the non-volatile memory 134.

The program 140 may be stored in the memory 130 as software, and may include, for example, an operating system (OS) 142, middleware 144, or an application 146 (e.g., application program).

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., a printed circuit board (PCB)). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

An electronic device according to an embodiment may be one of various types of electronic devices. The electronic device may include a portable communication device (e.g., a smart phone), a computer device, a portable multimedia device, a portable medical device, a camera, a wearable device, or a home appliance. However, the electronic device is not limited to any of those described above.

Various embodiments of the disclosure and the terms used herein are not intended to limit the technological features set forth herein to particular embodiments and include various changes, equivalents, or replacements for a corresponding embodiment. With regard to the description of the drawings, similar reference numerals may be used to refer to similar or related elements.

A singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases.

As used herein, such terms as "$1^{st}$" and "$2^{nd}$", or "first" and "second" may be used to simply distinguish a corresponding component from another, and does not limit the components in other aspect (e.g., importance or order). If an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

The term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2:
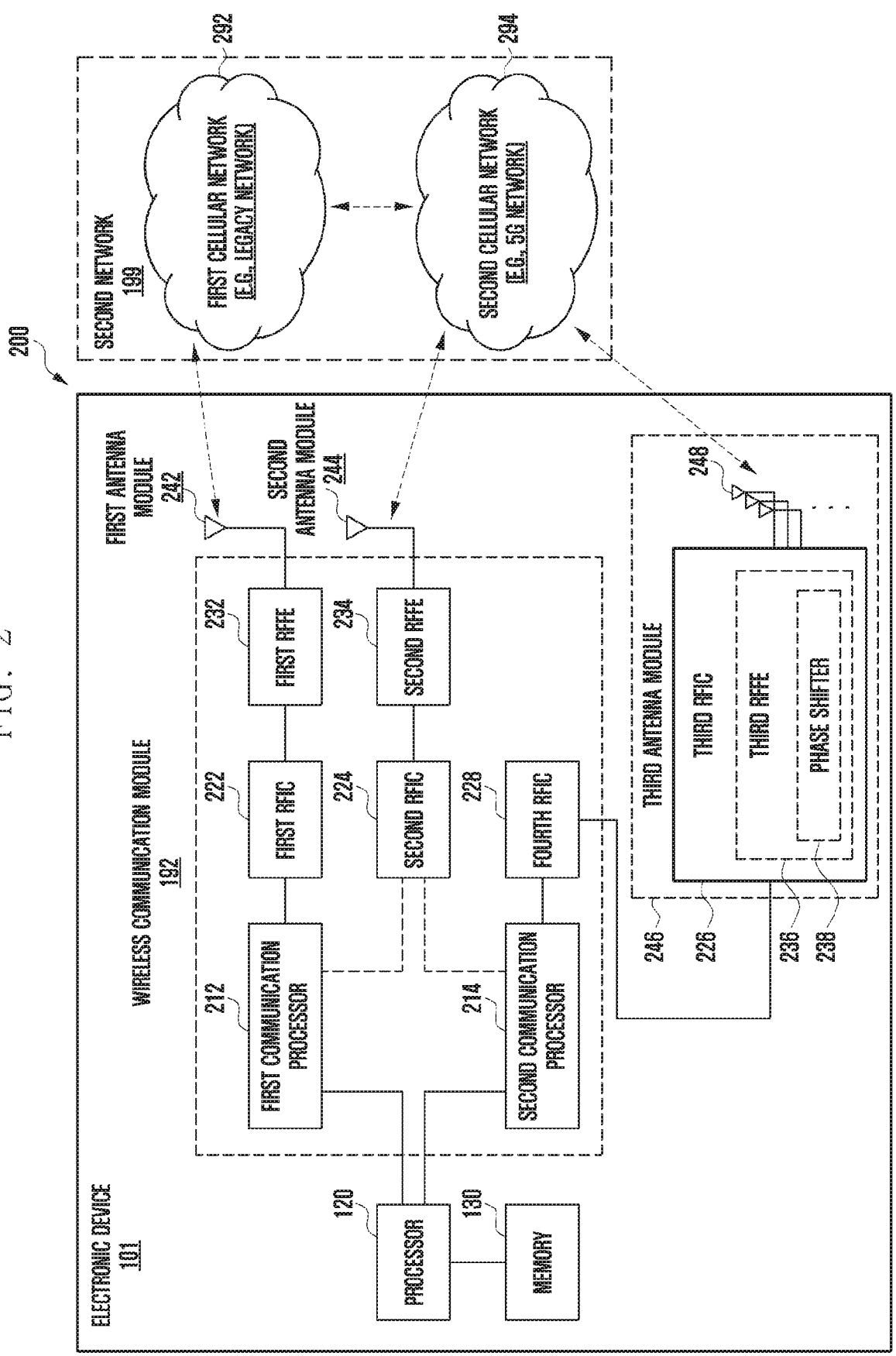
FIG. 2 is a block diagram of an electronic device for supporting legacy network communication and fifth generation (5G) network communication according to an embodiment.

FIG. 2 is a block diagram 200 of the electronic device 101 for supporting legacy network communication and 5G network communication according to various embodiments.

Referring to FIG. 2, the electronic device 101 may include a first CP 212, second CP 214, first RFIC 222, second RFIC 224, third RFIC 226, fourth RFIC 228, first radio frequency front end (RFFE) 232, second RFFE 234, first antenna module 242, second antenna module 244, and antenna 248. The electronic device 101 may include a processor 120 and a memory 130. A second network 199 may include a first cellular network 292 and a second cellular network 294. According to another embodiment, the electronic device 101 may further include at least one of the components described with reference to FIG. 1, and the second network 199 may further include at least one other network. According to one embodiment, the first CP 212, second CP 214, first RFIC 222, second RFIC 224, fourth RFIC 228, first RFFE 232, and second RFFE 234 may form at least part of the wireless communication module 192. According to another embodiment, the fourth RFIC 228 may be omitted or included as part of the third RFIC 226.

The first CP 212 may establish a communication channel of a band to be used for wireless communication with the first cellular network 292 and support legacy network communication through the established communication channel. According to various embodiments, the first cellular network may be a legacy network including a second generation (2G), 3G, 4G, or long term evolution (LTE) network. The second CP 214 may establish a communication channel corresponding to a designated band (e.g., about 6 GHz to about 60 GHz) of bands to be used for wireless communication with the second cellular network 294, and support 5G network communication through the established communication channel. According to various embodiments, the second cellular network 294 may be a 5G network defined in 3GPP. Additionally, according to an embodiment, the first CP 212 or the second CP 214 may establish a communication channel corresponding to another designated band (e.g., about 6 GHz or less) of bands to be used for wireless communication with the second cellular network 294 and support 5G network communication through the established communication channel. According to one embodiment, the first CP 212 and the second CP 214 may be implemented in a single chip or a single package. According to various embodiments, the first CP 212 or the second CP 214 may be formed in a single chip or a single package with the processor 120, the auxiliary processor 123, or the communication module 190.

Upon transmission, the first RFIC 222 may convert a baseband signal generated by the first CP 212 to a radio frequency (RF) signal of about 700 MHz to about 3 GHz used in the first cellular network 292 (e.g., legacy network). Upon reception, an RF signal may be obtained from the first cellular network 292 (e.g., legacy network) through an antenna (e.g., the first antenna module 242) and be preprocessed through an RFFE (e.g., the first RFFE 232). The first RFIC 222 may convert the preprocessed RF signal to a baseband signal so as to be processed by the first CP 212.

Upon transmission, the second RFIC 224 may convert a baseband signal generated by the first CP 212 or the second CP 214 to an RF signal (hereinafter, 5G Sub6 RF signal) of a Sub6 band (e.g., 6 GHz or less) to be used in the second cellular network 294 (e.g., 5G network). Upon reception, a 5G Sub6 RF signal may be obtained from the second cellular network 294 (e.g., 5G network) through an antenna (e.g., the second antenna module 244) and be pretreated through an RFFE (e.g., the second RFFE 234). The second RFIC 224 may convert the preprocessed 5G Sub6 RF signal to a baseband signal so as to be processed by a corresponding CP of the first CP 212 or the second CP 214.

The third RFIC 226 may convert a baseband signal generated by the second CP 214 to an RF signal (hereinafter, 5G Above6 RF signal) of a 5G Above6 band (e.g., about 6 GHz to about 60 GHz) to be used in the second cellular network 294 (e.g., 5G network). Upon reception, a 5G Above6 RF signal may be obtained from the second cellular network 294 (e.g., 5G network) through an antenna (e.g., the antenna 248) and be preprocessed through the third RFFE 236. The third RFIC 226 may convert the preprocessed 5G Above6 RF signal to a baseband signal so as to be processed by the second CP 214. According to one embodiment, the third RFFE 236 may be formed as part of the third RFIC 226.

According to an embodiment, the electronic device 101 may include a fourth RFIC 228 separately from the third RFIC 226 or as at least part of the third RFIC 226. In this case, the fourth RFIC 228 may convert a baseband signal generated by the second CP 214 to an RF signal (hereinafter, an intermediate frequency (IF) signal) of an intermediate frequency band (e.g., about 9 GHz to about 11 GHz) and transfer the IF signal to the third RFIC 226. The third RFIC 226 may convert the IF signal to a 5G Above 6RF signal. Upon reception, the 5G Above 6RF signal may be received from the second cellular network 294 (e.g., a 5G network) through an antenna (e.g., the antenna 248) and be converted to an IF signal by the third RFIC 226. The fourth RFIC 228 may convert an IF signal to a baseband signal so as to be processed by the second CP 214.

According to one embodiment, the first RFIC 222 and the second RFIC 224 may be implemented into at least part of a single package or a single chip. According to one embodiment, the first RFFE 232 and the second RFFE 234 may be implemented into at least part of a single package or a single chip. According to one embodiment, at least one of the first antenna module 242 or the second antenna module 244 may be omitted or may be combined with another antenna module to process RF signals of a corresponding plurality of bands.

According to one embodiment, the third RFIC 226 and the antenna 248 may be disposed at the same substrate to form a third antenna module 246. For example, the wireless communication module 192 or the processor 120 may be disposed at a first substrate (e.g., main PCB). In this case, the third RFIC 226 is disposed in a partial area (e.g., lower surface) of the first substrate and a separate second substrate (e.g., sub PCB), and the antenna 248 is disposed in another partial area (e.g., upper surface) thereof; thus, the third antenna module 246 may be formed. By disposing the third RFIC 226 and the antenna 248 in the same substrate, a length of a transmission line therebetween can be reduced. This may reduce, for example, a loss (e.g., attenuation) of a signal of a high frequency band (e.g., about 6 GHz to about 60

GHz) to be used in 5G network communication by a transmission line. Therefore, the electronic device 101 may improve a quality or speed of communication with the second cellular network 294 (e.g., 5G network).

According to one embodiment, the antenna 248 may be formed in an antenna array including a plurality of antenna elements that may be used for beamforming. In this case, the third RFIC 226 may include a plurality of phase shifters 238 corresponding to a plurality of antenna elements, for example, as part of the third RFFE 236. Upon transmission, each of the plurality of phase shifters 238 may convert a phase of a 5G Above6 RF signal to be transmitted to the outside (e.g., a base station of a 5G network) of the electronic device 101 through a corresponding antenna element. Upon reception, each of the plurality of phase shifters 238 may convert a phase of the 5G Above6 RF signal received from the outside to the same phase or substantially the same phase through a corresponding antenna element. This enables transmission or reception through beamforming between the electronic device 101 and the outside.

The second cellular network 294 (e.g., 5G network) may operate (e.g., stand-alone (SA)) independently of the first cellular network 292 (e.g., legacy network) or may be operated (e.g., non-stand alone (NSA)) in connection with the first cellular network 292. For example, the 5G network may have only an access network (e.g., 5G radio access network (RAN) or a next generation (NG) RAN and have no core network (e.g., next generation core (NGC)). In this case, after accessing to the access network of the 5G network, the electronic device 101 may access to an external network (e.g., Internet) under the control of a core network (e.g., an evolved packed core (EPC)) of the legacy network. Protocol information (e.g., LTE protocol information) for communication with a legacy network or protocol information (e.g., new radio (NR) protocol information) for communication with a 5G network may be stored in the memory 130 to be accessed by other components (e.g., the processor 120, the first CP 212, or the second CP 214).

Figure 3A:
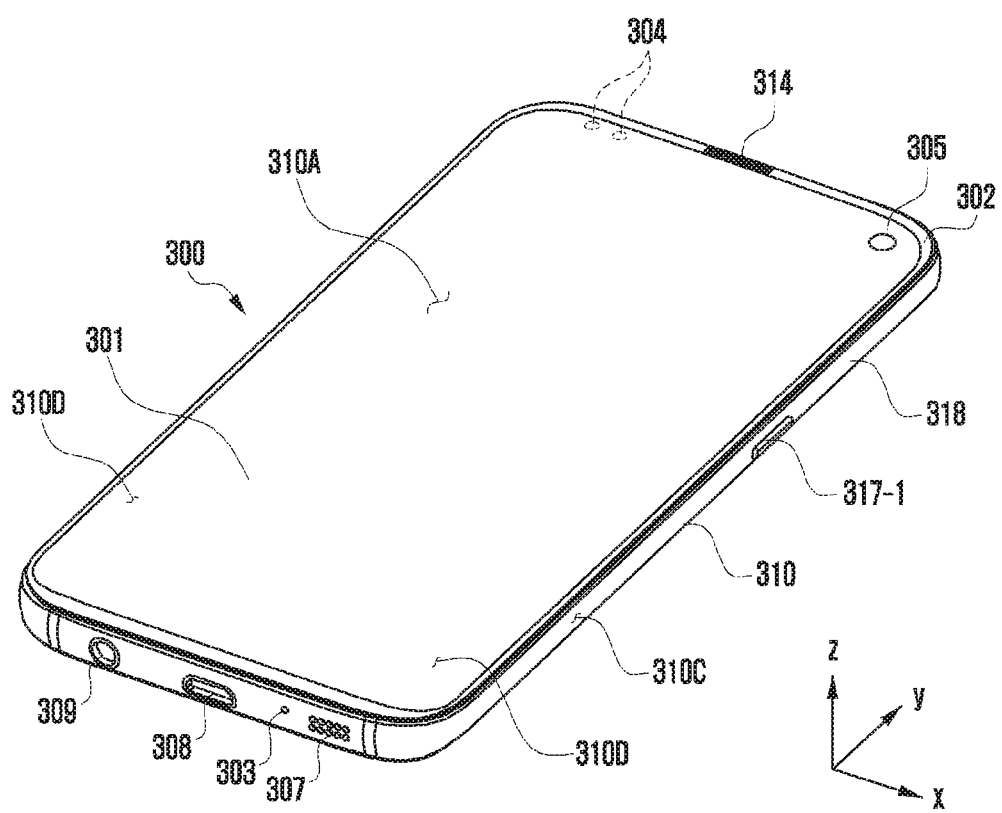
FIG. 3A illustrates a front perspective view of a mobile electronic device according to an embodiment.

FIG. 3A illustrates a front view of a mobile electronic device 300 according to an embodiment.

Figure 3B:
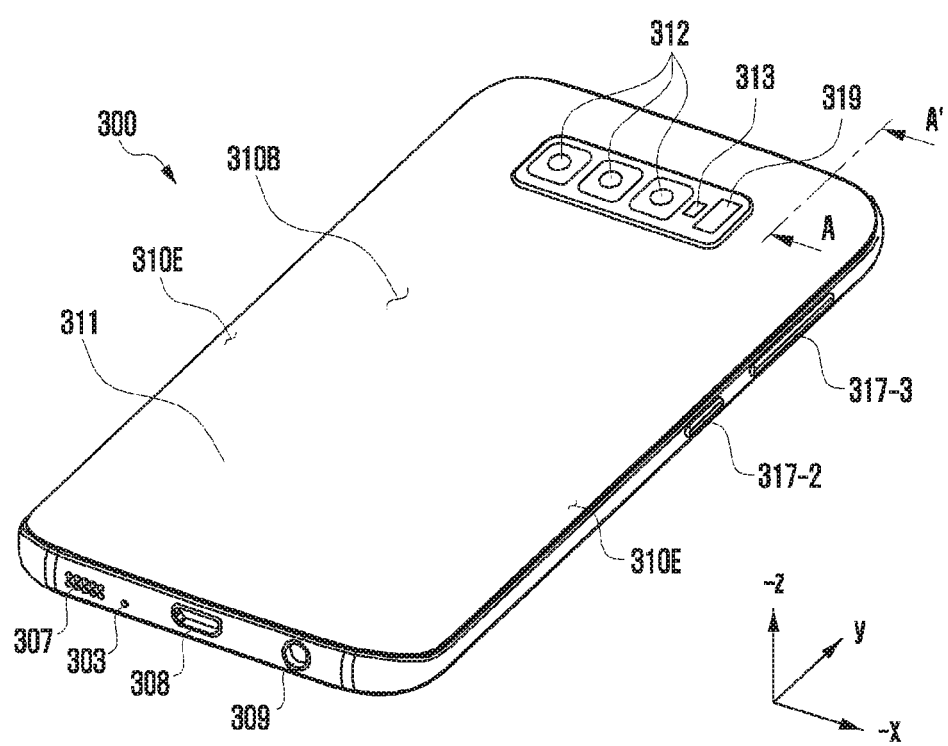
FIG. 3B illustrates a rear perspective view of the mobile electronic device according to an embodiment.

FIG. 3B illustrates a rear view of a mobile electronic device 300 according to an embodiment.

The electronic device 300 of FIGS. 3A and 3B may include at least some embodiments similar to or different from the electronic device 101 of FIG. 1.

Referring to FIGS. 3A and 3B, the mobile electronic device 300 (e.g., the electronic device 101 of FIG. 1) according to various embodiments may include a housing 310 including a first surface (or front surface) 310A, a second surface (or rear surface) 310B, and a side surface 310C enclosing a space between the first surface 310A and the second surface 310B. In one embodiment, the housing may refer to a structure forming some of the first surface 310A, the second surface 310B, and the side surface 310C. According to one embodiment, the first surface 310A may be formed by an at least partially substantially transparent front plate 302 (e.g., a polymer plate or a glass plate including various coating layers). The second surface 310B may be formed by a substantially opaque rear plate 311. The rear plate 311 may be formed by, for example, coated or colored glass, ceramic, polymer, metal (e.g., aluminum, stainless steel (STS), or magnesium), or a combination of at least two of the above materials. The side surface 310C may be coupled to the front plate 302 and the rear plate 311 and be formed by a side bezel structure (or "side member") 318 including a metal and/or a polymer. In some embodiments, the rear plate 311 and the side bezel structure 318 may be integrally formed and include the same material (e.g., metal material such as aluminum).

In the illustrated embodiment, the front plate 302 may include two first regions 310D bent and extended seamlessly from the first surface 310A toward the rear plate 311 at both ends of a long edge of the front plate 302. In the illustrated embodiment (see FIG. 3B), the rear plate 311 may include two second regions 310E bent and extended seamlessly from the second surface 310B towards the front plate 302 at both ends of a long edge. In some embodiments, the front plate 302 (or the rear plate 311) may include only one of the first regions 310D (or the second regions 310E). In one embodiment, a portion of the first regions 310D or the second regions 310E may not be included. In the above embodiments, when viewed from the side surface of the mobile electronic device 300, the side bezel structure 318 may have a first thickness (or width) at a side surface in which the first region 310D or the second region 310E is not included and have a second thickness smaller than the first thickness at a side surface including the first region 310D or the second region 310E.

In FIGS. 3A and 3B, the electronic device 300 may include at least one of a display 301, an input device 303, sound output devices 307 and 314, sensor modules 304 and 319, camera modules 305, 312 and 313, key input devices 317-1, 317-2 and 317-3, an indicator, and connectors 308 and 309. At least one of the components of the electronic device 300 (e.g., key input devices 317-1, 317-2 and 317-3, or indicator) may be omitted, or a different component may be added to the electronic device 300.

The display 301 may be exposed through, for example, a substantial portion of the front plate 302. In some embodiments, at least part of the display 301 may be exposed through the front plate 302 forming the first region 310D of the side surface 310C and the first surface 310A. The display 301 may be coupled to or disposed adjacent to a touch detection circuit, a pressure sensor capable of measuring intensity (pressure) of the touch, and/or a digitizer for detecting a stylus pen of a magnetic field method. In some embodiments, at least part of the sensor modules 304 and 319 and/or at least part of the key input device 317-1, 317-2, and 317-3 may be disposed in a first region 310D and/or a second region 310E.

The input device 303 may be a microphone or a plurality of microphones arranged to sense the direction of a sound. The sound output devices 307 and 314 may include speakers 307 and 314. The speakers 307 and 314 may include an external speaker 307 and a receiver 314 for a call. The microphone 303, the speakers 307 and 314, and the connectors 308 and 309 may be disposed inside the electronic device 300 and may be exposed to the external environment through at least one hole formed in the housing 310. The hole formed in the housing 310 may be used commonly for the microphone 303 and the speakers 307 and 314. The sound output devices 307 and 314 may include a piezo speaker operating without using the hole formed in the housing 310.

The sensor modules 304 and 319 may generate an electrical signal or a data value corresponding to an operating state inside the mobile electronic device 300 or an environment state outside the mobile electronic device 300. The sensor modules 304 and 319 may include, for example, a first sensor module 304 (e.g., proximity sensor) and/or a second sensor module (e.g., fingerprint sensor), disposed at the first surface 310A of the housing 310, and/or a third sensor module 319 (e.g., a heart rate monitor (HRM) sensor)

and/or a fourth sensor module 316 (e.g., fingerprint sensor), disposed at the second surface 310B of the housing 310. The fingerprint sensor may be disposed at the second surface 310B as well as the first surface 310A (e.g., the display 301) of the housing 310. The mobile electronic device 300 may further include a sensor module, for example, at least one of a gesture sensor, gyro sensor, air pressure sensor, magnetic sensor, acceleration sensor, grip sensor, color sensor, IR sensor, biometric sensor, temperature sensor, humidity sensor, and illumination sensor 304.

The camera modules 305, 312, and 313 may include a first camera device 305 disposed at the first surface 310A of the mobile electronic device 300, a second camera device 312 disposed at the second surface 310B thereof, and/or a flash 313. The camera modules 305 and 312 may include one or a plurality of lenses, an image sensor, and/or an ISP. The flash 313 may include, for example, a light emitting diode or a xenon lamp. In some embodiments, two or more lenses (infrared camera, wide angle and telephoto lens) and image sensors may be disposed at one surface of the mobile electronic device 300.

The key input device 317-1, 317-2, and 317-3 may be disposed at the side surface 310C of the housing 310. In one embodiment, the mobile electronic device 300 may not include some or all of the above-described key input devices 317-1, 317-2, and 317-3, and the key input device 317-1, 317-2, and 317-3 that is not included may be implemented in other forms such as a soft key on the display 301. In some embodiments, the key input device 317-1, 317-2, and 317-3 may include a sensor module 316 disposed at the second surface 310B of the housing 310.

The indicator may be disposed at, for example, the first surface 310A of the housing 310. The indicator may provide, for example, status information of the mobile electronic device 300 in an optical form. In one embodiment, the indicator may provide, for example, a light source interworking with an operation of the camera module 305. The indicator may include, for example, a light emitting diode (LED), an IR LED, and a xenon lamp.

The connector ports 308 and 309 may include a first connector port 308 that may receive a connector (e.g., a USB connector) for transmitting and receiving power and/or data to and from an external electronic device and/or a second connector hole (e.g., earphone jack) 309 that can receive a connector for transmitting and receiving audio signals to and from an external electronic device.

The camera module 305 of the camera modules 305 and 312, the sensor module 304 of the sensor modules 304 and 319, and the indicator may be arranged to be exposed through the display 301. For example, the camera module 305, the sensor module 304, and the indicator may be arranged inside the electronic device 300 so as to contact the external environment through an opening in an upper end of the display 301 and the front plate 302. Alternatively, one sensor module 304 may be disposed inside the electronic device so as to perform its functions without being visually exposed through the front plate 302. In this case, the perforated opening may be not required for the region of the display 301 facing the sensor module.

Figure 3C:
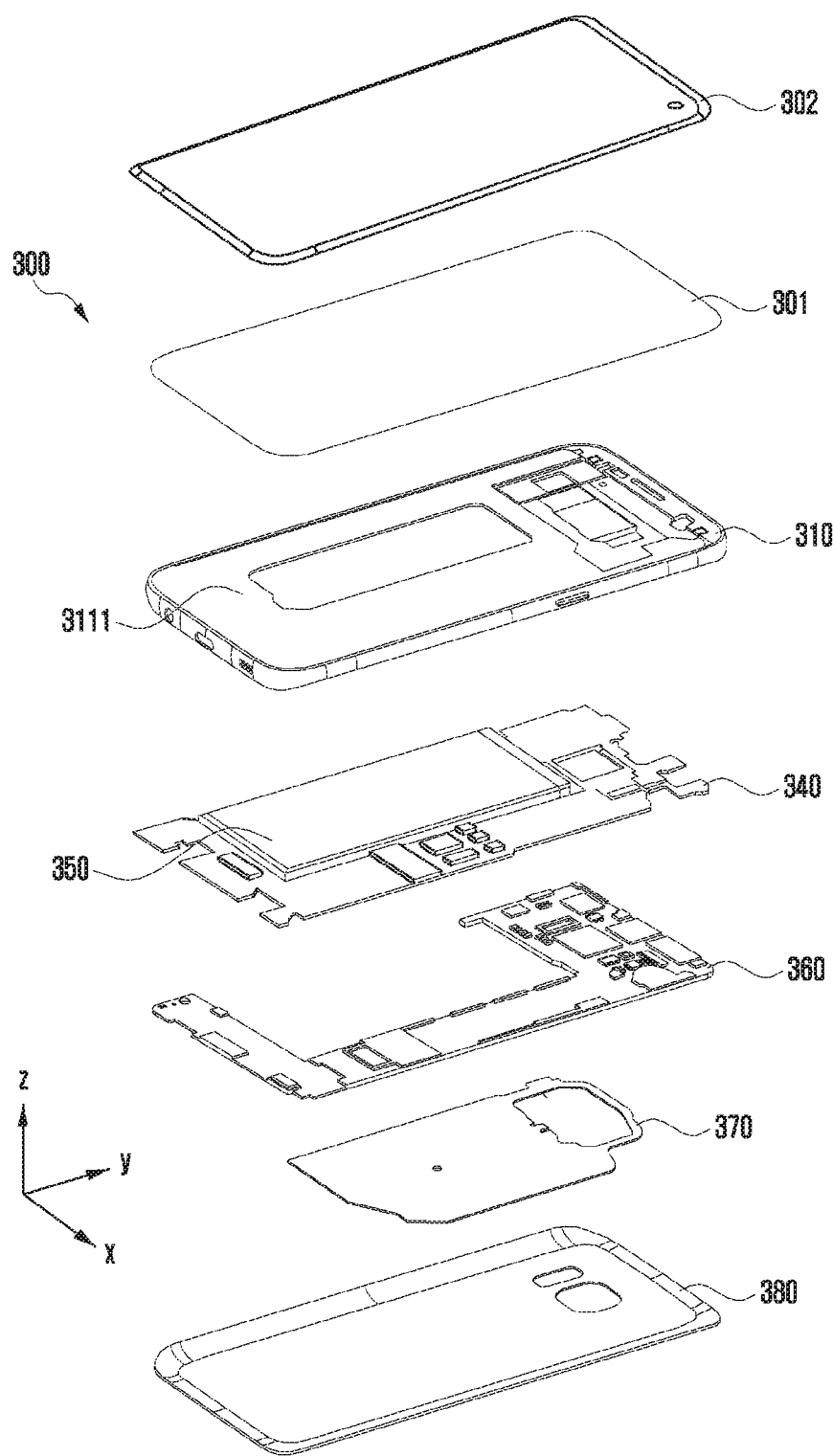
FIG. 3C illustrates an exploded perspective view of the mobile electronic device according to an embodiment.

FIG. 3C illustrates a mobile electronic device according to various embodiments of the disclosure.

Referring to FIG. 3C, the mobile electronic device 300 (e.g., the mobile electronic device 300 of FIG. 3A) may include a side bezel structure 310, first support member 3111 (e.g., bracket), front plate 302, display 301, PCB 340, battery 350, second support member 360 (e.g., rear case), antenna 370, and rear plate 380. In some embodiments, the electronic device 300 may omit at least one (e.g., the first support member 3111 or the second support member 360) of the components or may further include other components. At least one of the components of the electronic device 300 may be the same as or similar to at least one of the components of the mobile electronic device 300 of FIG. 3A or 3B and a duplicated description is omitted below.

The first support member 3111 may be disposed inside the electronic device 300 to be connected to the side bezel structure 310 or may be integrally formed with the side bezel structure 310. The first support member 3111 may be made of, for example, a metal material and/or a non-metal (e.g., polymer) material. In the first support member 3111, the display 301 may be coupled to one surface thereof, and the printed circuit board 340 may be coupled to the other surface thereof. In the PCB 340, a processor, a memory, and/or an interface may be mounted. The processor may include, for example, one or more of a CPU, AP, GPU, ISP, sensor hub processor, or CP.

The memory may include, for example, a volatile memory or a nonvolatile memory.

The interface may include, for example, a HDMI, USB interface, SD card interface, and/or audio interface. The interface may, for example, electrically or physically connect the electronic device 320 to an external electronic device and include a USB connector, an SD card/multimedia card (MMC) connector, or an audio connector.

The battery 350 is a device for supplying power to at least one component of the electronic device 300 and may include, for example, a non-rechargeable primary battery, a rechargeable secondary battery, or a fuel cell. At least part of the battery 350 may be disposed, for example, on substantially the same plane as that of the PCB 340. The battery 350 may be integrally disposed inside the electronic device 300 or may be detachably disposed in the electronic device 300.

The antenna 370 may be disposed between the rear plate 380 and the battery 350. The antenna 370 may include, for example, a near field communication (NFC) antenna, wireless charging antenna, and/or magnetic secure transmission (MST) antenna. The antenna 370 may perform, for example, short range communication with an external device or may wirelessly transmit and receive power required for charging. In one embodiment, an antenna structure may be formed by some or a combination of the side bezel structure 310 and/or the first support member 3111.

Figure 4A:
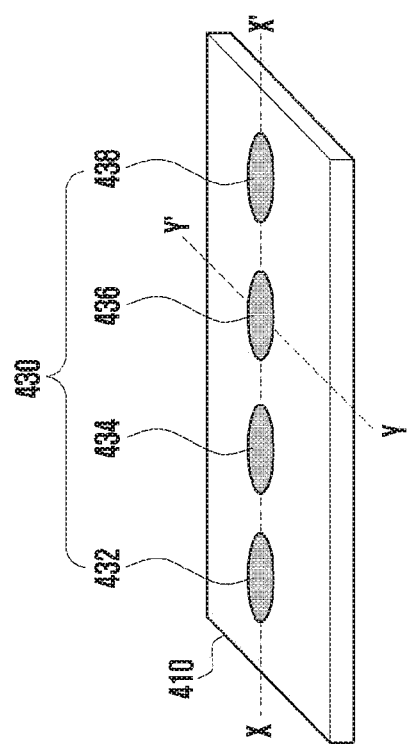
FIG. 4A illustrates the third antenna module viewed from a first side according to an embodiment.
Figure 4B:
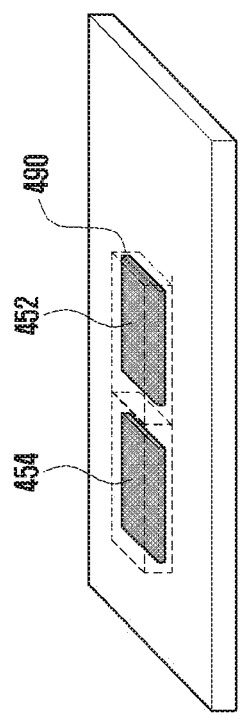
FIG. 4B illustrates the third antenna module viewed from a second side according to an embodiment.
Figure 4C:
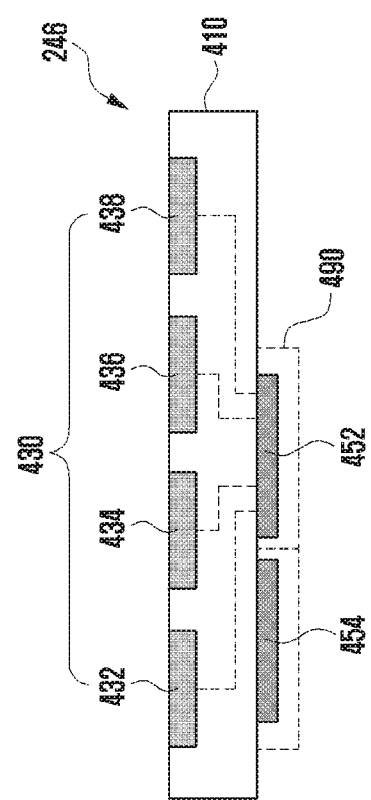
FIG. 4C illustrates a cross-sectional view of the third antenna module taken along line X-X' of FIG. 4A according to an embodiment.

FIG. 4A illustrates the third antenna module 246 viewed from a first side according to an embodiment, FIG. 4B illustrates the third antenna module 246 viewed from a second side according to an embodiment, and FIG. 4C illustrates a cross-section of the third antenna module 246 taken along line X-X' of FIG. 4A according to an embodiment.

With reference to FIGS. 4A, 4B and 4C, the third antenna module 246 may include a PCB 410, an antenna array 430, a RFIC 452, and a PMIC 454. Alternatively, the third antenna module 246 may further include a shield member 490. At least one of the above-described components may be omitted or at least two of the components may be integrally formed.

The PCB 410 may include a plurality of conductive layers and a plurality of non-conductive layers stacked alternately with the conductive layers. The PCB 410 may provide electrical connections between the PCB 410 and/or various electronic components disposed outside using wirings and conductive vias formed in the conductive layer.

The antenna array 430 (e.g., 248 of FIG. 2) may include a plurality of antenna elements 432, 434, 436, or 438 disposed to form a directional beam. As illustrated, the antenna elements 432, 434, 436, or 438 may be formed at a first surface of the PCB 410. According to another embodiment, the antenna array 430 may be formed inside the PCB 410. According to the embodiment, the antenna array 430 may include the same or a different shape or kind of a plurality of antenna arrays (e.g., dipole antenna array and/or patch antenna array).

The RFIC 452 (e.g., the third RFIC 226 of FIG. 2) may be disposed at another area (e.g., a second surface opposite to the first surface) of the PCB 410 spaced apart from the antenna array. The RFIC 452 is configured to process signals of a selected frequency band transmitted/received through the antenna array 430. According to one embodiment, upon transmission, the RFIC 452 may convert a baseband signal obtained from a CP to an RF signal of a designated band. Upon reception, the RFIC 452 may convert an RF signal received through the antenna array 430 to a baseband signal and transfer the baseband signal to the CP.

According to another embodiment, upon transmission, the RFIC 452 may up-convert an IF signal (e.g., about 9 GHz to about 11 GHz) obtained from an intermediate frequency integrate circuit (IFIC) (e.g., 228 of FIG. 2) to an RF signal of a selected band. Upon reception, the RFIC 452 may down-convert the RF signal obtained through the antenna array 430, convert the RF signal to an IF signal, and transfer the IF signal to the IFIC.

The PMIC 454 may be disposed in another partial area (e.g., the second surface) of the PCB 410 spaced apart from the antenna array 430. The PMIC 454 may receive a voltage from a main PCB to provide power necessary for various components (e.g., the RFIC 452) on the antenna module.

The shielding member 490 may be disposed at a portion (e.g., the second surface) of the PCB 410 so as to electromagnetically shield at least one of the RFIC 452 or the PMIC 454. According to one embodiment, the shield member 490 may include a shield can.

In various embodiments, the third antenna module 246 may be electrically connected to another PCB (e.g., main circuit board) through a module interface. The module interface may include a connecting member, for example, a coaxial cable connector, board to board connector, interposer, or flexible PCB (FPCB). The RFIC 452 and/or the PMIC 454 of the antenna module may be electrically connected to the PCB through the connection member.

Figure 4D:
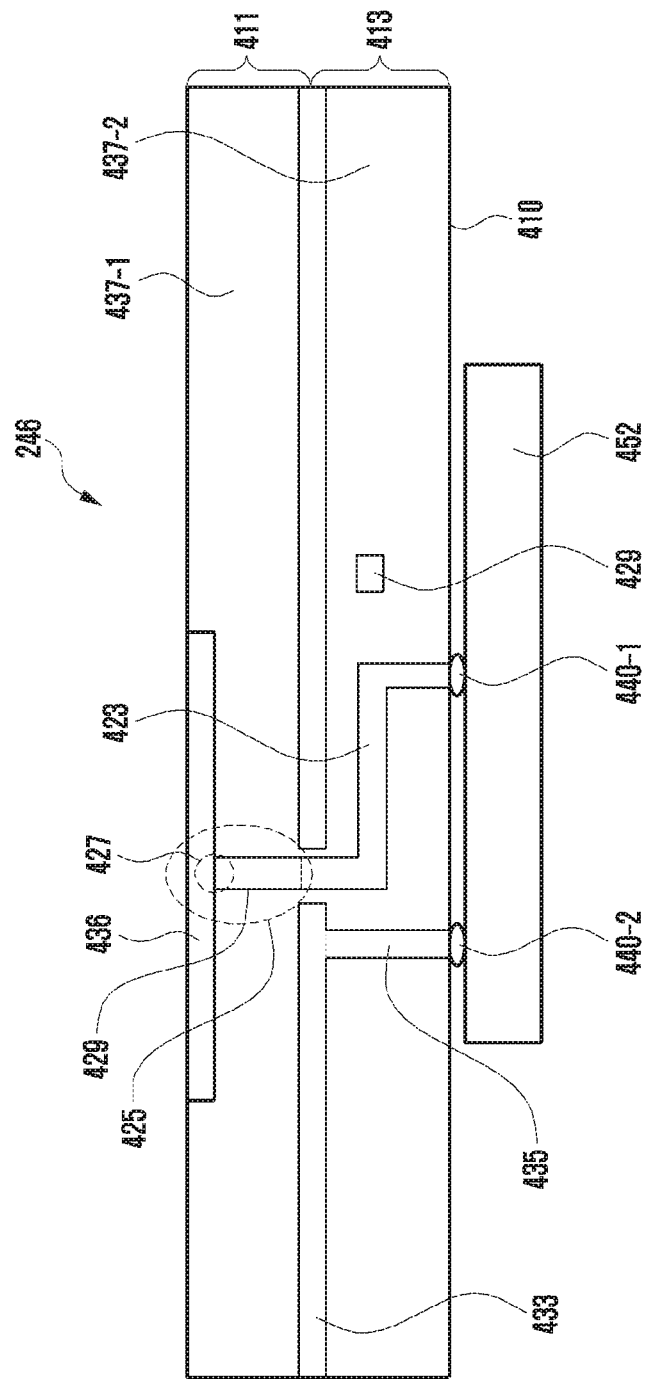
FIG. 4D is a cross-sectional view of the third antenna module along the line Y-Y' in FIG. 4A according to an embodiment.

FIG. 4D is a cross-sectional view illustrating the third antenna module 246 taken along line Y-Y' of FIG. 4A according to various embodiments of the disclosure. The PCB 410 of the illustrated embodiment may include an antenna layer 411 and a network layer 413.

With reference to FIG. 4D, the antenna layer 411 may include at least one dielectric layer 437-1, and an antenna element 436 and/or a power feeding portion 425 formed on or inside an outer surface of a dielectric layer. The power feeding portion 425 may include a power feeding point 427 and/or a power feeding line 429.

The network layer 413 may include at least one dielectric layer 437-2, at least one ground layer 433, at least one conductive via 435, a transmission line 423, and/or a power feeding line 429 formed on or inside an outer surface of the dielectric layer.

Further, in the illustrated embodiment, the RFIC 452 (e.g., the third RFIC 226 of FIG. 2) of FIG. 4C may be electrically connected to the network layer 413 through, for example, first and second solder bumps 440-1 and 440-2. In other embodiments, various connection structures (e.g., solder or ball grid array (BGA)) instead of the solder bumps may be used. The RFIC 452 may be electrically connected to the antenna element 436 through the first solder bump 440-1, the transmission line 423, and the power feeding portion 425. The RFIC 452 may also be electrically connected to the ground layer 433 through the second solder bump 440-2 and the conductive via 435. The RFIC 452 may also be electrically connected to the above-described module interface through the power feeding line 429.

Figure 5A:
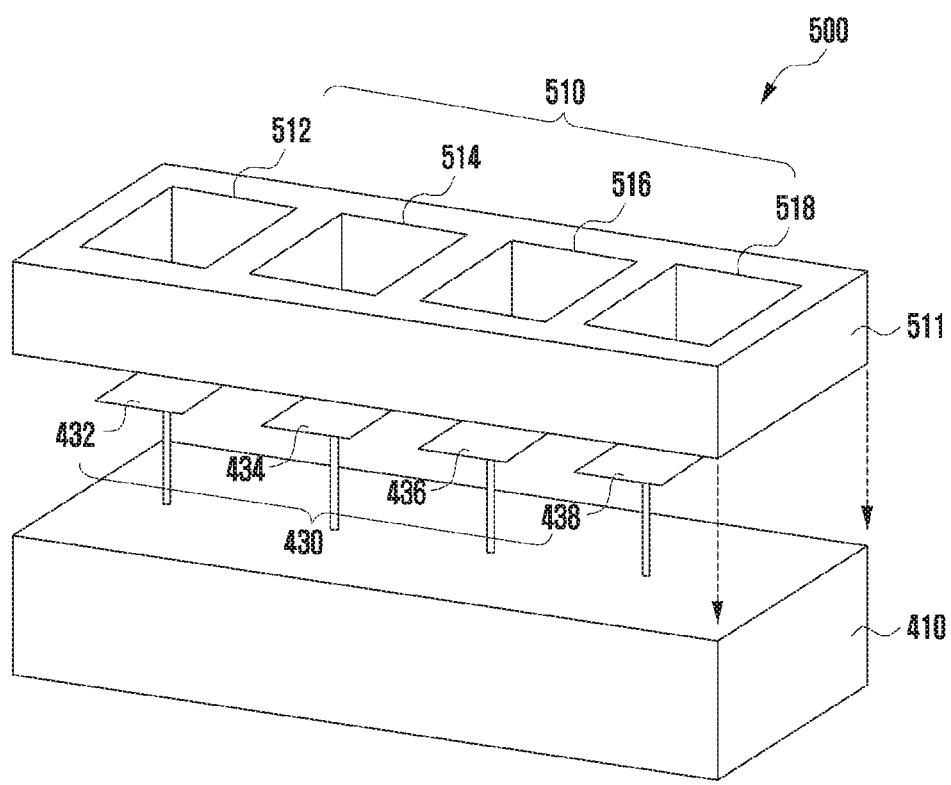
FIG. 5A illustrates a structure obtained by including a director in the component shown in FIG. 4A according to an embodiment.

FIG. 5A illustrates a structure obtained by including a director in the component shown in FIG. 4A according to an embodiment.

Specifically, FIG. 5A illustrates an antenna array 430 constituting at least one antenna module 500. The antenna array 430 may be arranged as a conductive pattern on at least one layer of the PCB 410 and may be disposed on the outer layer for exposure. The at least one antenna module 500 may include a director 511, an antenna array 430, and a PCB 410.

With reference to FIG. 5A, the antenna array 430 may be disposed on at least one layer of the PCB 410. The director 511 formed to at least partially surround the antenna array 430 may be electrically connected to a grip sensor circuit. The antenna array 430 may include at least one antenna element 432, 434, 436 and/or 438 (e.g., conductive patch) arranged to form a directional beam. The PCB 410 may include a director 511 corresponding to the at least one antenna element 432, 434, 436 and/or 438. The director 511 may be formed in a shape surrounding the at least one antenna element 432, 434, 436 and/or 438, and may be formed to have at least one electrical opening 510 (512, 514, 516 and/or 518) corresponding to the at least one antenna element 432, 434, 436 and/or 438. The electrical opening 510 may be filled with air or a dielectric forming the substrate. The electrical opening 510 may be formed in a conductive pattern on the PCB 410. The director 511 includes the at least one electrical opening 512, 514, 516 and/or 518 formed corresponding respectively with the at least one antenna element 432, 434, 436 and/or 438, and may be disposed on at least one layer of the PCB 410.

The first antenna element 432 and the second antenna element 434 may be arranged spaced apart by a preset distance, and the first electrical opening 512 of the director 511 may be formed corresponding to the position of the first antenna element 432. The first opening 512 formed at least partially in the director 511 may have a shape surrounding the first antenna element 432. The director 511 may include at least partially a conductive member and may function as a director. The director 511 may be a component that functions independently and may improve radiation performance of a transmission signal through the antenna array 430, as the following will explain.

The director 511 may at least partially include a conductive member, and may receive a signal (e.g., data) from the external environment based on the conductive member. The director 511 may be electrically connected to a grip sensor circuit mounted on the electronic device. The director 511 can at least partially function as an electrode of the grip sensor. The electronic device 300 can measure the amount of electrical change of the director 511. For example, a certain amount of electrical change may occur in the director 511 due to the influence of the external environment. The electronic device 300 may measure the electrical change amount of the director 511 with an electrode of the grip sensor and may detect a grip on the electronic device 300 based on the measured electrical change amount.

The director 511 may be used as an electrode of a grip sensor for detecting a user grip on the electronic device 300. For example, the electronic device 300 may measure the amount of electrical change in the director 511 and may detect a user grip based on the measured electrical change amount.

The electronic device 300 may detect a user grip by using the director 511 as an electrode of the grip sensor and may decrease the power supplied to the antenna array 430 by a preset back-off value upon detecting a user grip. Specifically, upon detecting a user grip, the electronic device 300 may change the at least one antenna module 500 functioning as a radiator. The at least one antenna module 500 may be activated to be utilized as a radiator or may be deactivated not to be utilized as a radiator. When a user grip is detected, the electronic device 300 may change the beam in use through the at least one antenna module 500. The electronic device 300 may monitor a user grip and, when a user grip is detected, may control the at least one antenna module 500 so that electromagnetic waves associated with the transmission signal are not harmful to the human body.

Figure 5B:
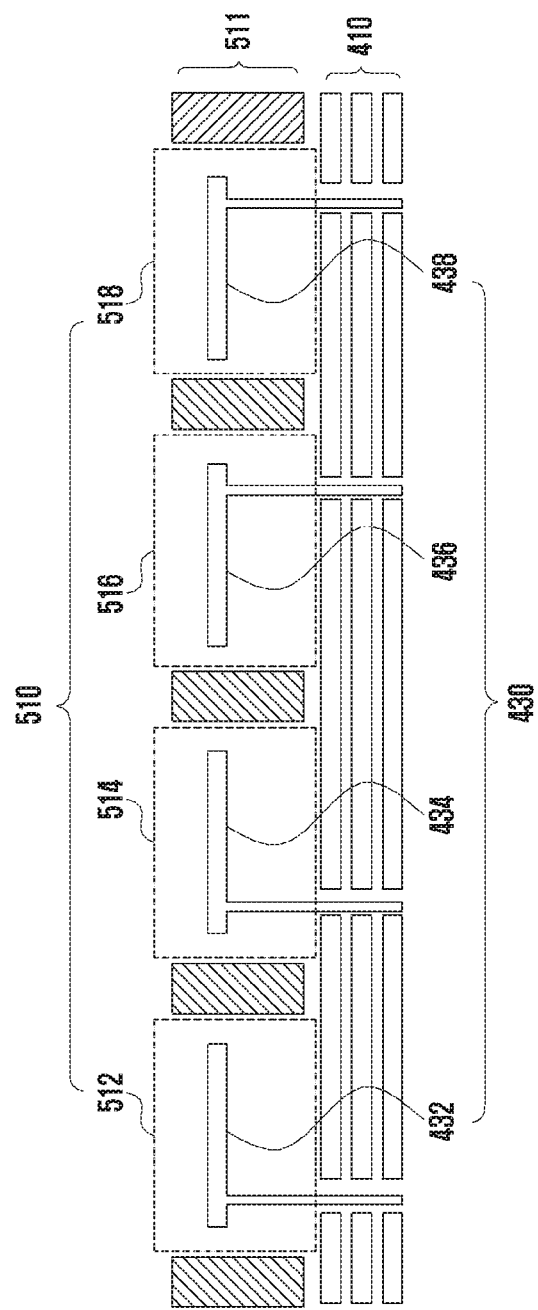
FIG. 5B is a partial cross-sectional view of the structure obtained by including a director in the component shown in FIG. 4A according to an embodiment.

FIG. 5B is a partial cross-sectional view of the structure obtained by including a director in the component shown in FIG. 4A according to an embodiment.

With reference to FIG. 5B, at least one antenna module 500 may include a director 511 and an antenna array 430 formed on some layers of the PCB 410.

The antenna array 430 may be disposed as a conductive pattern on at least one layer of the PCB 410. The antenna array 430 may be at least partially electrically connected to the PCB 410. For example, the antenna array 430 may be electrically connected to the RFIC 452 mounted on the PCB 410. The antenna array 430 may function as a radiator for signal transmission and may include at least one antenna element 432, 434, 436 and/or 438.

The director 511 may be formed as a conductive pattern on some layers of the PCB 410 and may include at least one electrical opening 510. The director 511 in which the at least one electrical opening 512, 514, 516 and/or 518 is formed in correspondence respectively with the at least one antenna element 432, 434, 436 and/or 438 may be formed as a conductive pattern on the some layers. For example, the first opening 512 may be formed in a shape surrounding the first antenna element 432 in correspondence with the position of the first antenna element 432. The director 511 may function to improve the directivity of the antenna array 430. When the electronic device 300 transmits a signal by using the antenna array 430 which radiates in a single direction, the director 511 may improve the radiation performance of the signal.

The electronic device 300 may adjust the amount of power supplied to the at least one antenna module 500. The electronic device 300 may activate the at least one antenna module 500 to utilize it as a radiator or may deactivate the at least one antenna module 500 not to utilize it as a radiator. The electronic device 300 may change the beam for the at least one antenna module 500.

Figure 6A:
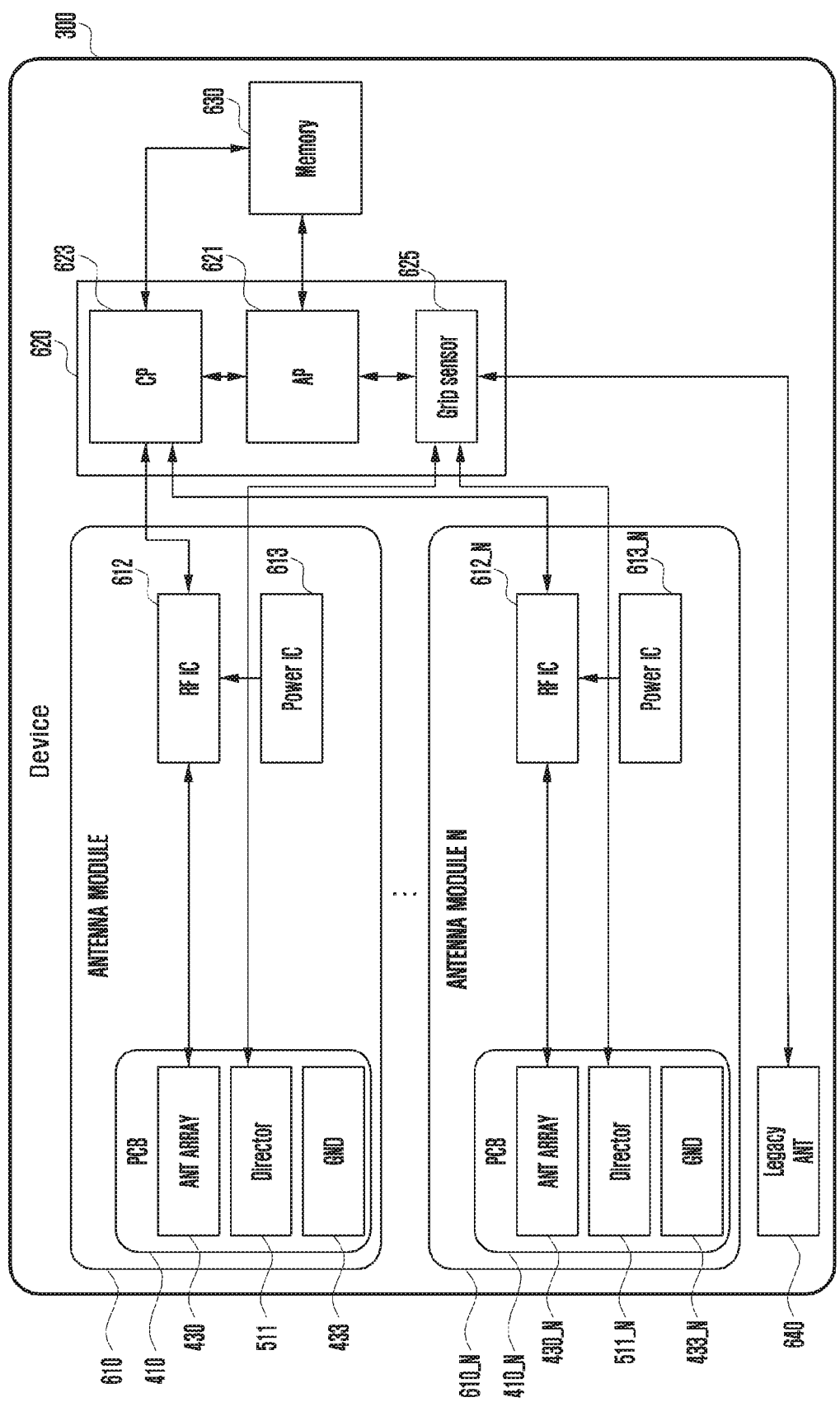
FIG. 6A is a block diagram of an electronic device in which a grip sensor circuit for sensing a grip by the user is included in the processor according to an embodiment.

FIG. 6A illustrates an electronic device in which a grip sensor circuit for sensing a grip by the user is included in the processor according to an embodiment.

With reference to FIG. 6A, the electronic device may include at least one antenna module (e.g., antenna module 610, . . . , antenna module_N 610_N), a processor 620, a memory 630, and/or a legacy antenna 640. At least one of the at least one antenna module 610 may transmit a signal of the mmWave band (e.g., about 6 GHz to about 60 GHz) based on a 5G network. The legacy antenna 640 may transmit a signal of a second generation (2G), third generation (3G), fourth generation (4G), or LTE band based on a legacy network.

The at least one antenna module 610, 610_N may include PCBs 410, 410_N, RF ICs 612, 612_N, and/or PMICs 613, 613_N, respectively. The PCBs 410, 410_N may include antenna arrays 430, 430_N, directors 511, 511_N, and/or grounds (GND) 433, 433_N, respectively. The antenna arrays 430, 430_N may be composed of at least one antenna element supporting the mmWave band. The directors 511, 511_N may be a conductive member (e.g., director) improving the radiation performance of the transmission signal through the antenna arrays 430, 430_N.

The antenna arrays 430, 430_N included in the PCBs 410, 410_N may be electrically connected to the RF ICs 612, 612_N. The RF ICs 612, 612_N may be supplied with power from the PMICs 613, 613_N included in the at least one antenna module 610, 610_N. The processor 620 may control the RF ICs 612, 612_N and may transmit and receive a signal of the mmWave band through the antenna arrays 430, 430_N.

The directors 511, 511_N included in the PCBs 410, 410_N may be electrically connected to the grip sensor circuit 625 included in the processor 620. The grip sensor circuit 625 may be electrically connected to the directors 511, 511_N included in the at least one antenna module 610, 610_N, the legacy antenna 640, and/or the AP 621. The processor 620 may control the grip sensor circuit 625 to analyze a signal acquired through the directors 511, 511_N (e.g., grip-related data for the electronic device 300). For example, the directors 511, 511_N can function as an electrode for the grip sensor circuit 625. An alternating current of several hundred milli-amperes (mA) or several A may flow between the director 511, 511_N and the grip sensor circuit 625.

When an object (e.g., human body) is close to or comes into contact with the electronic device 300, the directors 511, 511_N may generate a current of several hundred mA corresponding to a second frequency band (e.g., several hundred KHz) less than a preset first frequency band (e.g., several hundred MHz or several GHz). The grip sensor circuit 625 may measure the generated current of several hundred mA and detect that an object is close to or is in contact with the electronic device 300 based on the current change amount of the directors 511, 511_N. The directors 511, 511_N may function as a grip sensor for detecting a user grip. The component utilized as a grip sensor may be not limited to the directors 511, 511_N. For example, a conductive material included in the at least two antenna modules 610, 610_N may be used as an electrode for the grip sensor circuit 625.

The processor 620 may include an AP 621, a CP 623, and a grip sensor circuit 625. The AP 621 may process commands or data received from other components (e.g., at least one antenna module 610, 610_N and legacy antenna 640) or store the commands or data in the memory 630. For example, the AP 621 may receive a grip-related signal through the grip sensor circuit 625 and determine whether the electronic device is gripped based on the received grip-related signal. In various embodiments, upon determining that the electronic device is gripped, the processor 620 may control the operation of the at least one antenna module 610, 610_N. The processor 620 may reduce the amount of power supplied to the at least one antenna module 610, 610_N or may not utilize the at least one antenna module 610, 610_N as a radiator. The processor 620 may change the type of the beam emitted through the at least one antenna module 610, 610_N.

The memory 630 may store signals (e.g., data) related to proximity of or contact with an object. The memory 630 may store a preset offset table, and the processor 620 may determine the amount of power supplied to the at least one antenna module 610, 610_N based on the offset table. The memory 630 may store a signal corresponding to the grip pattern on the electronic device 300. For example, the processor 620 may identify the grip pattern on the electronic device 300 based on the signal obtained through the directors 511, 511_N. The signal may be stored in the form of a table (e.g., offset table). The processor 620 may determine whether the electronic device 300 is gripped by using the directors 511, 511_N and may determine the amount of power supplied to at least one of the at least one antenna module 610, 610_N based on the offset table stored in the memory 630.

The memory 630 may store data (e.g., offset table) for adjusting the power supplied to the at least one antenna module 610, 610_N in response to proximity of an object. The data can be stored in the form of a table. The power of the transmission signal may be set below a preset threshold so as not to adversely affect the human body. For example, the power of the transmission signal may be set to a value within a range that does not adversely affect the human body while permitting communication based on the mmWave band. The transmission signal may be determined based on a maximum permissible exposure (MPE) reference value. The processor 620 may determine the power of the transmission signal so as not to adversely affect the human body based on the MPE reference value.

The grip sensor circuit 625 may be included in the processor 620 and may be electrically connected to the directors 511, 511N of the at least one antenna module 610, . . . , 610N. The directors 511, 511N may function as a grip sensor. For example, the processor 620 may measure the amount of current change in the directors 511, 511N, and may determine whether the electronic device 300 is gripped based on the measured amount of current change. As the electronic device 300 utilizes the directors 511, 511N as a grip sensor, a separate space for installing a grip sensor may be not required for the grip sensor and can be utilized for other purposes. The electronic device 300 may use the director 511, 511_N included in the antenna module 610, 610_N as an electrode for the grip sensor circuit 625.

Figure 6B:
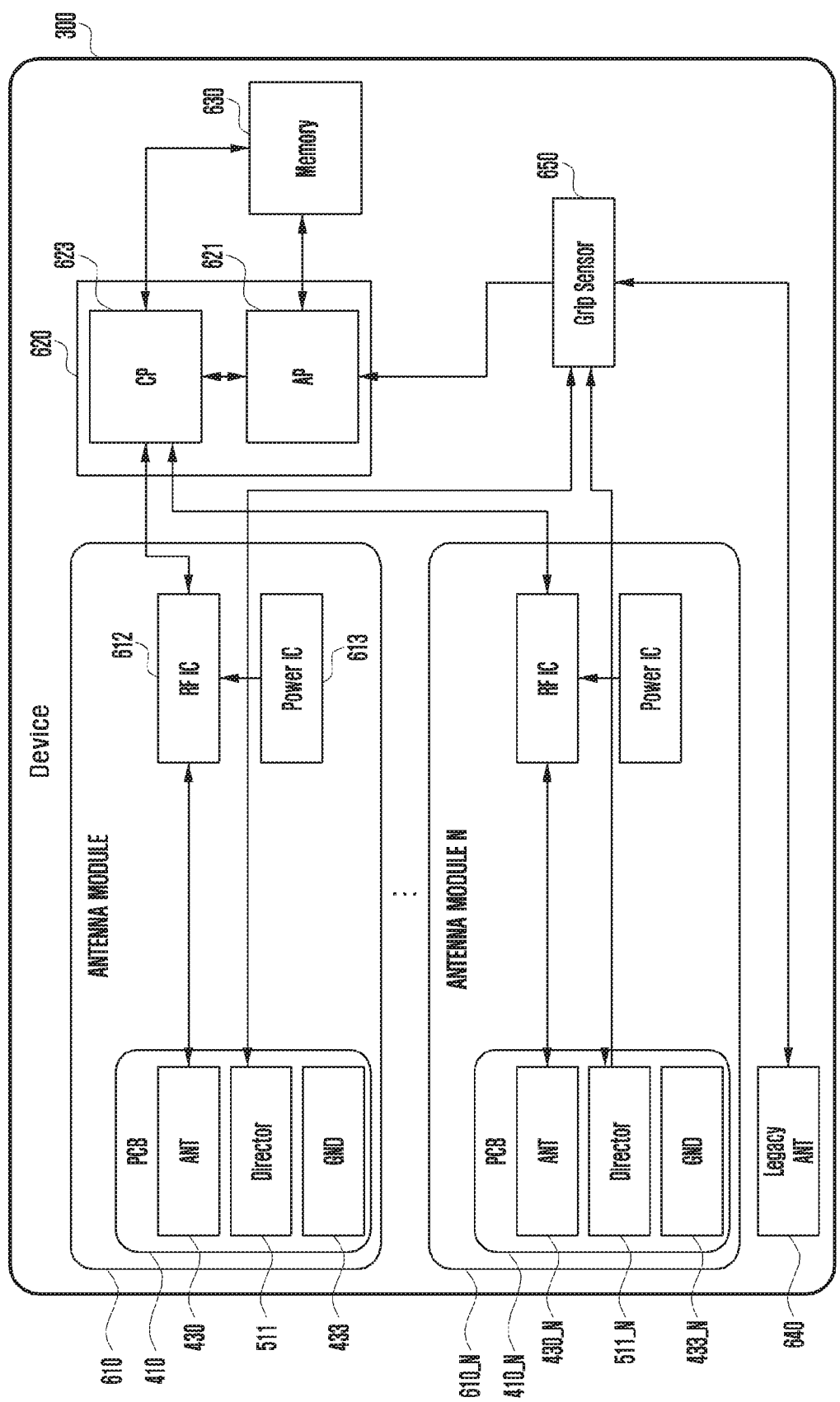
FIG. 6B is a block diagram of an electronic device in which a grip sensor circuit for sensing a grip by the user is independently included according to an embodiment.

FIG. 6B illustrates an electronic device in which a grip sensor circuit for sensing a grip by the user is independently included according to an embodiment.

The electronic device 300 of FIG. 6B may include the same components as in FIG. 6A with a difference being the position where the grip sensor circuit 650 is mounted. With reference to FIG. 6B, the grip sensor circuit 650 may be independently mounted as one of the components of the electronic device 300. The grip sensor circuit 650 may be electrically connected to each of the at least one directors 511, 511N included in the at least two antenna modules 610, 610N. For example, the grip sensor circuit 650 may use the directors 511, 511_N included in the at least one antenna module 610, 610_N as an electrode for sensing proximity of an object. A single grip sensor circuit 650 may be independently mounted in the electronic device 300, and the grip sensor circuit 650 may be electrically connected to the directors 511, 511_N of the at least one antenna module 610, 610_N.

According to an embodiment as described above, an electronic device (e.g., electronic device 600 in FIG. 6A) may include: a housing (e.g., housing 310 in FIG. 3A) including a front cover (e.g., front plate 302 in FIG. 3A), a rear cover (e.g., rear plate 311 in FIG. 3A) facing in a direction opposite to the front cover 302, and a side member (e.g., side member 310c in FIG. 3A) surrounding the space between the front cover 302 and the rear cover 311, at least one antenna module (e.g., antenna module 610 in FIG. 6A) arranged in the space, at least one grip sensor circuit (e.g., grip sensor circuit 625 in FIG. 6A) disposed in the space and electrically connected to at least one conductive portion (e.g., director 511 in FIG. 6A), and at least one processor (e.g., processor 620 in FIG. 6A) operatively connected to the at least one antenna module 610 and the at least one grip sensor circuit 625.

The at least one antenna module 610 may include: a printed circuit board (PCB) (e.g., printed circuit board 410 in FIG. 5A) disposed in the space, including a first surface and a second surface facing in a direction opposite to the first surface, and at least partially including a ground layer; at least one conductive antenna (e.g., antenna elements 432, 434, 436 and 438 in FIG. 5A) disposed on the first surface of the PCB or disposed close to the first surface in the internal space of the PCB, at least one conductive portion (e.g., director 511 in FIG. 5A) disposed around the conductive antenna, and a wireless communication circuit disposed on the second surface of the PCB and configured to transmit and/or receive a radio signal having a frequency between 3 GHz and 100 GHz through at least one antenna element. The at least one processor 620 may be configured to obtain a grip related signal from the at least one conductive portion 511 included in the at least one antenna module 610, detect a grip on the electronic device through the grip sensor circuit based on the obtained signal, and control the operation of the at least one antenna module 610 in response to the detected grip.

The at least one conductive portion 511 of the at least one antenna module 610 may include a director to improve radiation performance for a transmission signal.

The at least one processor 620 may be configured to measure the amount of current change in the conductive portion 511 through the grip sensor circuit 625, and determine whether the electronic device 300 is gripped based on the measured amount of current change.

The electronic device 300 may further include a memory (e.g., memory 630 in FIG. 6A) to store a reference value for maximum permissible exposure (MPE). The at least one processor 620 may be configured to compare the measured current change with the reference value and determine the level of power supplied to the at least one antenna module 610 to be less than the reference value.

The at least one processor 620 may be configured to detect an object that is in close proximity to or in contact with the electronic device 300 based on the at least one conductive portion 511, measure the distance between the electronic device 300 and the object, and control the power supplied to the at least one antenna module 610 based on the measured distance.

The at least one processor 620 may be configured to determine that lower power is supplied to the at least one antenna module 610 as the measured distance decreases.

The at least one processor 620 may be configured to detect a first direction in which the object approaches, and control the power of a first transmission signal radiated toward the detected first direction.

The at least one processor 620 may be configured to determine the level of power of the first transmission signal radiated toward the first direction to be less than the level of power of a second transmission signal radiated toward a second direction opposite to the first direction.

The at least one grip sensor circuit 625 may be independently formed inside the electronic device in correspondence with the at least one antenna module 610. The at least one processor 620 may be configured to determine whether the electronic device 300 is gripped by using the at least one grip sensor circuit 625 electrically connected to the at least one conductive portion 511.

The at least one processor 620 may be configured to select at least one antenna module 610 to be used as a radiator in response to detection of a grip, and control the power supplied to the selected at least one antenna module 610.

The at least one conductive portion 511 may be shorted to the ground layer of the PCB and may measure the amount of current change according to a grip on the electronic device 300.

According to an embodiment as described above. an electronic device (e.g., electronic device 600 in FIG. 6A) may include: a housing (e.g., housing 310 in FIG. 3A) including a front cover (e.g., front plate 302 in FIG. 3A), a rear cover (e.g., rear plate 311 in FIG. 3A) facing in a direction opposite to the front cover 302, and a side member (e.g., side member 310c in FIG. 3A) surrounding the space between the front cover 302 and the rear cover 311, at least one first antenna module (e.g., antenna module 610 in FIG. 6A) arranged in the space, at least one second antenna module arranged in the space and configured to transmit and/or receive a radio signal having a frequency between 700 Hz and 3 GHz through at least one antenna element, at least one grip sensor circuit (e.g., grip sensor circuit 625 in FIG. 6A) arranged in the space and electrically connected to at least one conductive portion included in the at least one first antenna module and at least one conductive portion included in the at least one second antenna module, and at least one processor (e.g., processor 620 in FIG. 6A) operatively connected to the at least one first antenna module, the at least one second antenna module, and the at least one grip sensor circuit.

The at least one processor 620 may be configured to obtain a first signal related to a grip from the at least one conductive portion 511 included in the at least one first antenna module 610, obtain a second signal related to a grip from the at least one conductive portion included in the at least one second antenna module, identify the grip pattern on the electronic device based on the first signal and the second signal, and control the operation of the first antenna module and the second antenna module based on the identified grip pattern.

The at least one processor 620 may be configured to control the power of a first transmission signal associated with the first antenna module and the power of a second transmission signal associated with the second antenna module according to the identified grip pattern.

The conductive portion 511 of the at least one first antenna module 610 may include a director to improve radiation performance for the first transmission signal.

The at least one processor 620 may be configured to measure a change in a first current corresponding to the conductive portion of the at least one first antenna module, measure a change in a second current corresponding to the conductive portion of the at least one second antenna module, and identify the grip pattern on the electronic device based on the measured changes in the first current and the second current.

The at least one processor 620 may be configured to identify the direction in which the user's face is located based on the identified grip pattern, and determine the power supplied to the first antenna module and the power supplied to the second antenna module according to the identified direction.

The at least one grip sensor circuit 625 may be independently formed inside the electronic device in correspondence with the at least one first antenna module. The at least one processor 620 may be configured to identify the grip pattern on the electronic device by using the at least one grip sensor circuit electrically connected to the at least one conductive portion.

The at least one processor 620 may be configured to select at least one antenna module to be used as a radiator, and control the power supplied to the selected at least one antenna module based on the identified grip pattern.

Figure 7:
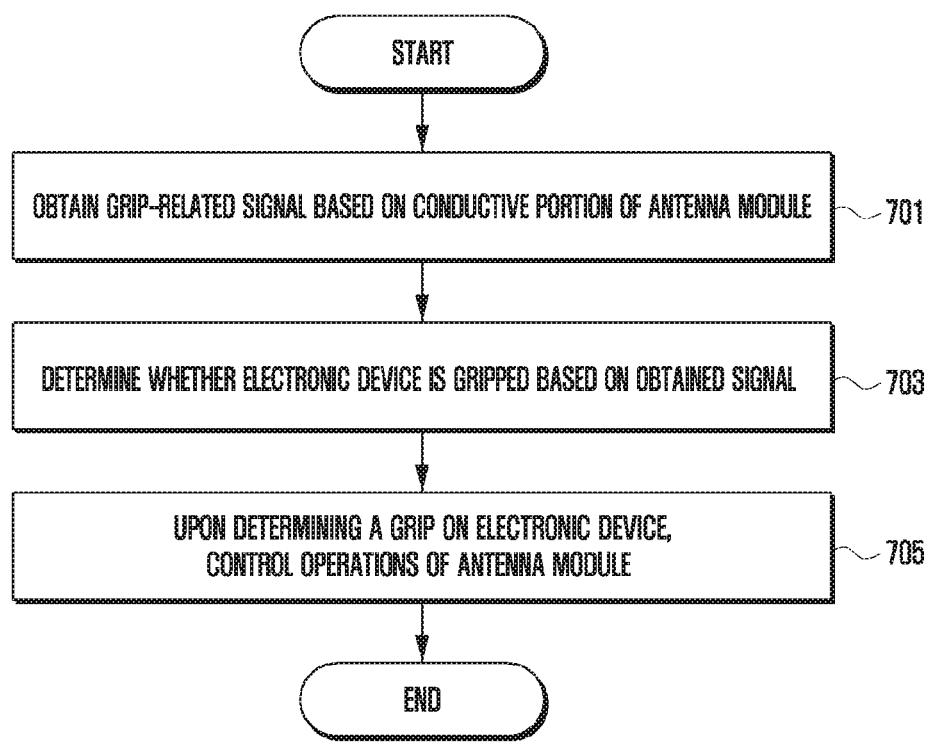
FIG. 7 is a flowchart of a method of detecting a grip by using a conductive portion of the antenna module and controlling the operation of the antenna module depending upon grip detection according to an embodiment.

FIG. 7 illustrates a method of detecting a grip by using a conductive portion of the antenna module and controlling the operation of the antenna module depending upon grip detection according to an embodiment.

With reference to FIG. 7, in step 701, the processor of the electronic device may obtain a grip related signal through a conductive portion included in at least one antenna module. The conductive portion may include a director of the antenna module 610. The processor 620 may analyze the grip related signal obtained through the director 511 of the antenna module 610. The director 511 and the grip sensor circuit may be electrically connected, and an alternating current of several hundred mA or several A may flow between the director 511 and the grip sensor circuit 625. The processor 620 may obtain a signal corresponding to a change in current between the director 511 and the grip sensor circuit 625 (e.g., change from a first current value to a second current value less than the first current value).

For example, when the user grips the electronic device 300, the current between the director 511 and the grip sensor circuit 625 may decrease. The processor 620 may obtain a signal corresponding to a change of current. The processor 620 may measure the capacitor value for the director 511. The processor 620 may determine whether the electronic device 300 is gripped based on the measured capacitor value.

In step 703, the processor 620 may determine whether the electronic device 300 is gripped by using the grip sensor circuit 625 based on the obtained grip-related signal. The processor 620 may detect an object in close proximity to or in contact with the electronic device 300. For example, the grip sensor circuit 625 may measure the amount of current change in the director 511. The processor 620 may determine whether the electronic device 300 is gripped based on the amount of current change measured by the grip sensor circuit 625. The director 511 may generate a current of several hundred mA corresponding to a second frequency band (e.g., several hundred KHz) less than a preset first frequency band (e.g., several hundred MHz or several GHz) in response to a grip on the electronic device 300. The processor 620 may determine whether the electronic device 300 is gripped based on the amount of current change.

Upon determining that the electronic device 300 is gripped, in step 705, the processor 620 may control the operation of the antenna module 610. The processor 620 may control the amount of power supplied to the antenna module 610 based on an MPE reference level in response to a grip on the electronic device 300. MPE indicates the power density transmitted to the human body, and the MPE reference level may be a reference value corresponding to an MPE range that does not adversely affect the human body.

The data related to the MPE reference level may be stored as a table in the memory of the electronic device 300. The processor 620 may lower the power supplied to the antenna module 610 based on the MPE reference level stored in the memory 630. The processor 620 may lower the power of the transmission signal so that the strength of the electromagnetic wave for the transmission signal satisfies the MPE reference level. The less the distance is between the electronic device 300 and the object, the lower the power supplied to the antenna module 610 may be.

The processor 620 may detect a direction in which the object approaches and may control the power of a transmission signal based on the detected direction. For example, the power of a first transmission signal corresponding to a first direction in which the object approaches may be set to be less than the power of a second transmission signal corresponding to a second direction opposite to the first direction. The processor 620 may set the power of the first transmission signal to be relatively less than the power of the second transmission signal. The processor 620 may identify the direction in which the object approaches and determine whether to use at least one antenna module 610 as a radiator according to the identified direction. For example, the processor 620 may reduce the amount of power supplied to the antenna module 610 disposed adjacent to the object and increase the amount of power supplied to the antenna module 610 disposed relatively far from the object.

The processor 620 may determine whether the electronic device 300 is gripped and change the type of a beam radiated through the antenna module 610 accordingly.

Figure 8:
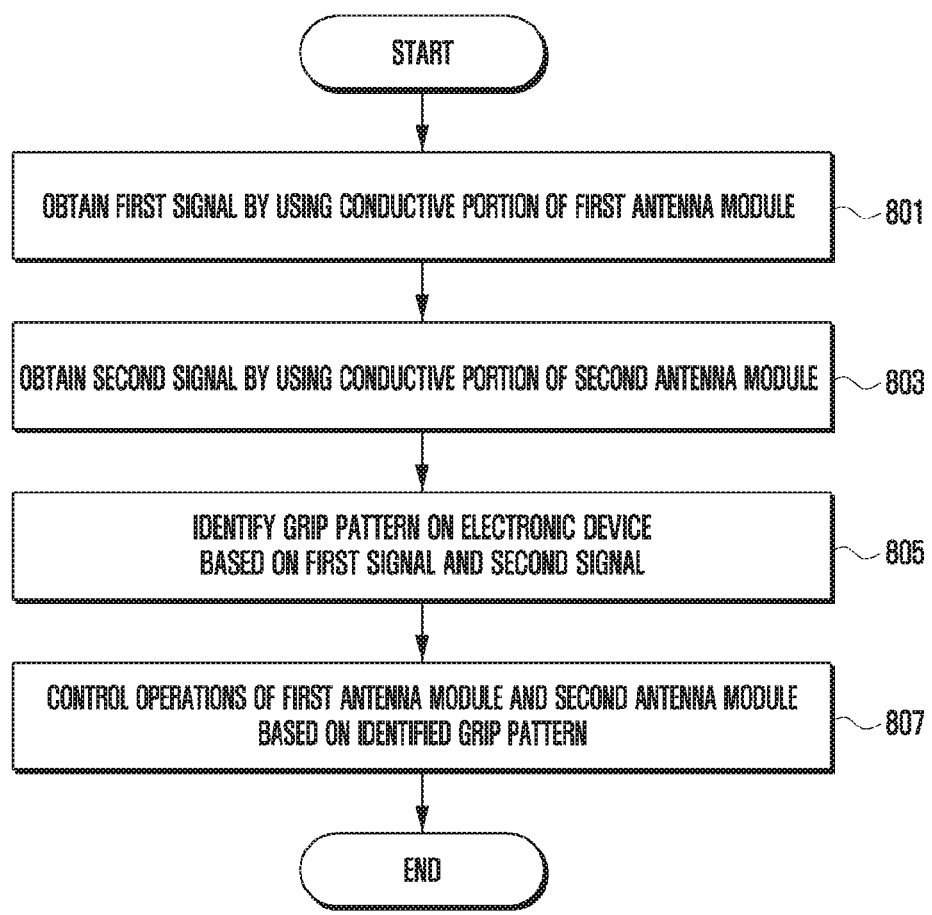
FIG. 8 is a flowchart of a method for identifying a grip pattern on the electronic device by using at least one antenna module and controlling the operation of the at least one antenna module based on the identified grip pattern according to an embodiment.

FIG. 8 illustrates a method for identifying a grip pattern on the electronic device by using at least one antenna module and controlling the operation of the at least one antenna module based on the identified grip pattern according to an embodiment.

With reference to FIG. 8, in step 801, the processor of the electronic device may obtain a first signal by using a conductive portion included in the first antenna module supporting 5G network communication. For example, there may be a plurality of first antenna modules 610, which may be mounted inside the electronic device 300. The first signal may be measured differently according to the mounting position of the first antenna module 610. The first signal may be a current change corresponding to the first antenna module 610 in response to the proximity of an object to the electronic device 300.

In step 803, the processor 620 of the electronic device 300 may obtain a second signal by using a conductive portion (e.g., radiator of a legacy antenna) included in the second antenna module. The second signal may be measured differently according to the mounting position of the second antenna module 640. The second signal may be a current change corresponding to the second antenna module 640 in response to the proximity of an object to the electronic device 300. The second antenna module 640 is not limited to a legacy antenna and may be another antenna module supporting 5G network communication.

In step 805, the processor 620 may identify the grip pattern on the electronic device 300 based on the first signal and the second signal. For example, the processor 620 may check the posture of, position of, or grip on the electronic device 300. The conductive portion of the first antenna module 610 and the conductive portion of the second antenna module may be electrically connected to the grip sensor circuit. A current of a preset value may flow between the first antenna module 610 and the grip sensor circuit 625.

A current of a preset value may also flow between the second antenna module 640 and the grip sensor circuit 625. The first current between the first antenna module 610 and the grip sensor circuit 625 and the second current between the second antenna module and the grip sensor circuit 625 may or may not be set to the same value. The processor 620 may identify the direction in which the user approaches the electronic device 300 or the pattern of the user grip on the electronic device 300 based on the first current value and the second current value.

In step 807, the processor 620 may control operations of the first antenna module 610 and the second antenna module based on the identified grip pattern. For example, the processor 620 may determine the power supplied to the antenna module based on the MPE reference value. The MPE reference value may indicate a threshold corresponding to an MPE range that does not adversely affect the human body. The MPE reference values may be stored as a table in the memory. The processor 620 may determine the power of the transmission signal to be less than a threshold corresponding to the MPE reference value.

The processor 620 may set the power of a transmission signal for each of the first antenna module 610 and the second antenna module. The processor 620 may determine at least one antenna module to be used as a radiator based on the grip pattern and may set the power of a transmission signal for the determined at least one antenna module. For example, when one surface of the electronic device 300 is brought into contact with the face of the user attempting to make a call, the processor 620 may set the power of transmission signals differently for each of the first antenna module 610 and second antenna module. For example, the electronic device 300 may include a first antenna module emitting a signal in a first direction in which the user's face is located, and a second antenna module emitting a signal in a second direction opposite to the first direction. The processor 620 may set the signal power of the first antenna module to be less than that of the second antenna module. The processor 620 may set the power of a signal corresponding to the antenna module radiating directly to the human body to be low. The processor 620 may adjust the power of the transmission signal to thereby minimize the adverse effect on the human body.

The processor 620 may change the type of a beam emitted through the antenna module. The processor 620 may change the type of a beam to reduce electromagnetic waves that adversely affect the human body.

According to an embodiment as described above. a grip sensing method may include obtaining a first signal based on at least one conductive portion (e.g., director 511 in FIG. 6A) included in at least one first antenna module (e.g., antenna module 610 in FIG. 6A), determining whether the electronic device (e.g., electronic device 300 in FIG. 3) is gripped by using a grip sensor circuit (e.g., grip sensor circuit 625 in FIG. 6A) based on the obtained first signal, and controlling the at least one antenna module 610 in response to the grip.

The grip sensing method may further include obtaining a second signal based on at least one conductive portion included in at least one second antenna module (e.g., legacy antenna 640 in FIG. 6A), identifying the grip pattern on the electronic device 300 based on the first signal and the second signal, and controlling the first antenna module 610 and the second antenna module 640 based on the identified grip pattern.

While the disclosure has been particularly shown and described with reference to certain embodiments thereof, it will be understood by those skilled in the art that various changes in form and details may be made therein without departing from the scope of the subject matter as defined by the appended claims and their equivalents.

What is claimed is:

1. An electronic device comprising:
a housing including a front cover, a rear cover facing in a direction opposite to the front cover, and a side member surrounding a space between the front cover and the rear cover;
at least one antenna module arranged in the space and including:
a printed circuit board (PCB) disposed in the space and including a first surface and a second surface facing in a direction opposite to the first surface, and at least partially including a ground layer;
at least one conductive antenna disposed on the first surface of the PCB or disposed close to the first surface in an internal space of the PCB;
at least one conductive portion disposed around the conductive antenna; and
a wireless communication circuit disposed on the second surface of the PCB and configured to transmit and/or receive a radio signal having a frequency between 3 gigahertz (GHz) and 100 GHz through at least one antenna element;
at least one grip sensor circuit disposed in the space and electrically connected to the at least one conductive portion; and
at least one processor operatively connected to the at least one antenna module and the at least one grip sensor circuit,
wherein the at least one processor is configured to obtain a grip related signal from the at least one conductive portion included in the at least one antenna module, determine whether the electronic device is gripped through the grip sensor circuit based on the obtained signal, and control operations of the at least one antenna module in response to the grip.

2. The electronic device of claim 1,
wherein the at least one conductive portion of the at least one antenna module includes a director that improves radiation performance for a transmission signal.

3. The electronic device of claim 1,
wherein the at least one processor is further configured to measure an amount of current change in the conductive portion through the grip sensor circuit, and determine whether the electronic device is gripped based on the measured current change amount.

4. The electronic device of claim 3, further comprising a memory configured to store a reference value for maximum permissible exposure (MPE),
wherein the at least one processor is further configured to compare the measured current change amount with the reference value and determine a level of power supplied to the at least one antenna module to be less than the reference value.

5. The electronic device of claim 1, wherein the at least one processor is further configured to:
detect an object that is in close proximity to or in contact with the electronic device based on the at least one conductive portion;
measure a distance between the electronic device and the object; and
control power supplied to the at least one antenna module based on the measured distance.

6. The electronic device of claim 5,
wherein the at least one processor is further configured to determine that less power is supplied to the at least one antenna module as the measured distance decreases.

7. The electronic device of claim 5,
wherein the at least one processor is further configured to detect a first direction in which the object approaches, and control power of a first transmission signal radiated toward the detected first direction.

8. The electronic device of claim 7,
wherein the at least one processor is further configured to determine a level of power of the first transmission signal radiated toward the first direction to be less than a level of power of a second transmission signal radiated toward a second direction opposite to the first direction.

9. The electronic device of claim 1,
wherein the at least one grip sensor circuit is independently formed inside the electronic device in correspondence with the at least one antenna module; and
wherein the at least one processor is further configured to determine whether the electronic device is gripped by using the at least one grip sensor circuit electrically connected to the at least one conductive portion.

10. The electronic device of claim 1,
wherein the at least one processor is further configured to select at least one antenna module to be used as a radiator in response to the grip, and control power supplied to the selected at least one antenna module.

11. The electronic device of claim 1,
wherein the at least one conductive portion is shorted to the ground layer of the PCB, and
wherein an amount of current change is measured according to a grip on the electronic device.

12. An electronic device comprising:
a housing including a front cover, a rear cover facing in a direction opposite to the front cover, and a side member surrounding a space between the front cover and the rear cover;
at least one first antenna module arranged in the space and including:
a printed circuit board (PCB) disposed in the space and including a first surface and a second surface facing in a direction opposite to the first surface, and at least partially including a ground layer;
at least one conductive antenna disposed on the first surface of the PCB or disposed close to the first surface in an internal space of the PCB;
at least one conductive portion disposed around the conductive antenna; and
a wireless communication circuit disposed on the second surface of the PCB and configured to transmit and/or receive a radio signal having a frequency between 3 gigahertz (GHz) and 100 GHz through at least one antenna element;
at least one second antenna module arranged in the space and configured to transmit and/or receive a radio signal having a frequency between 700 hertz (Hz) and 3 GHz through at least one antenna element;
at least one grip sensor circuit arranged in the space and electrically connected to the at least one conductive portion included in the at least one first antenna module and at least one conductive portion included in the at least one second antenna module; and
at least one processor operatively connected to the at least one first antenna module, the at least one second antenna module, and the at least one grip sensor circuit,
wherein the at least one processor is configured to obtain a first signal related to a grip from the at least one conductive portion included in the at least one first antenna module, obtain a second signal related to a grip from the at least one conductive portion included in the at least one second antenna module, identify a grip pattern on the electronic device based on the first signal and the second signal, and control operations of the first antenna module and the second antenna module based on the identified grip pattern.

13. The electronic device of claim 12,
wherein the at least one processor is further configured to control power of a first transmission signal associated with the first antenna module and power of a second transmission signal associated with the second antenna module according to the identified grip pattern.

14. The electronic device of claim 13,
wherein the conductive portion of the at least one first antenna module includes a director that improves radiation performance for the first transmission signal.

15. The electronic device of claim 12, wherein the at least one processor is further configured to:
   measure a change in a first current corresponding to the conductive portion of the at least one first antenna module;
   measure a change in a second current corresponding to the conductive portion of the at least one second antenna module; and
   identify a grip pattern on the electronic device based on the measured changes in the first current and the second current.

16. The electronic device of claim 12,
wherein the at least one processor is further configured to detect a direction in which a user's face is located based on the identified grip pattern, and determine a level of power supplied to each of the first antenna module and to the second antenna module according to the detected direction.

17. The electronic device of claim 12,
wherein the at least one grip sensor circuit is independently formed inside the electronic device in correspondence with the at least one first antenna module; and
wherein the at least one processor is further configured to identify the grip pattern on the electronic device by using the at least one grip sensor circuit electrically connected to the at least one conductive portion.

18. The electronic device of claim 12,
wherein the at least one processor is further configured to select at least one antenna module to be used as a radiator based on the identified grip pattern, and control power supplied to the selected at least one antenna module.

* * * * *